(12) United States Patent
Lin et al.

(10) Patent No.: US 6,523,083 B1
(45) Date of Patent: Feb. 18, 2003

(54) SYSTEM AND METHOD FOR UPDATING FLASH MEMORY OF PERIPHERAL DEVICE

(75) Inventors: Kun-Long Lin, Yung-He (TW); Pei-Jei Hu, Taipei (TW); Wei-Ming Su, Taipai (TW)

(73) Assignee: Via Technologies, Inc., Taipei (TW)

( * ) Notice: Subject to any disclaimer, the term of this patent is extended or adjusted under 35 U.S.C. 154(b) by 21 days.

(21) Appl. No.: 09/714,998

(22) Filed: Nov. 20, 2000

(30) Foreign Application Priority Data

Dec. 9, 1999 (TW) .......................................... 88121610

(51) Int. Cl.⁷ ............................ G06F 12/00; G06F 13/10
(52) U.S. Cl. ............................................. 711/103; 710/8
(58) Field of Search ............................. 711/103; 713/1, 713/100; 710/8, 10, 13

(56) References Cited

U.S. PATENT DOCUMENTS

| | | | | | |
|---|---|---|---|---|---|
| 5,603,056 A | * | 2/1997 | Totani | ............................ | 710/8 |
| 5,819,108 A | * | 10/1998 | Hsu et al. | ...................... | 710/10 |
| 5,901,330 A | * | 5/1999 | Sun et al. | ........................ | 710/8 |
| 6,009,497 A | * | 12/1999 | Wells et al. | ................. | 711/103 |
| 6,038,640 A | * | 3/2000 | Terme | .......................... | 711/115 |
| 6,151,657 A | * | 11/2000 | Sun et al. | .................... | 711/103 |
| 6,253,281 B1 | * | 6/2001 | Hall | ............................ | 711/112 |

* cited by examiner

*Primary Examiner*—Gary J Porter
(74) *Attorney, Agent, or Firm*—Rabin & Berdo, P.C.

(57) ABSTRACT

A system for updating a flash memory of a peripheral device including a host sending an update content. The host sends an update content. The peripheral device contains a peripheral interface controller and a flash memory. The peripheral interface controller couples to the host, and the flash memory couples to the peripheral interface controller. When the peripheral interface controller detects a signal for updating the flash memory from the host, the peripheral interface controller updates the flash memory according to the update content.

10 Claims, 5 Drawing Sheets

SYSTEM AND METHOD FOR UPDATING FLASH MEMORY OF PERIPHERAL DEVICE

This application incorporates by reference Taiwanese application Serial No. 88121610, Filed Dec. 9, 1999.

BACKGROUND OF THE INVENTION

1. Field of Invention

The present invention relates to a method and system for updating a flash memory of peripheral devices. More particularly, the present invention relates to a method and system for updating a flash memory of peripheral devices in a computer system.

2. Description of Related Art

Peripheral devices of a computer system may contain a flash memory for storing programs to drive it. The flash memory is reprogrammable and the computer system can reprogram, or update, the flash memory when needed. For example, the flash memory needs to be updated when there are bugs in the program stored in the flash memory, or when a new version is released.

There are two methods for updating a flash memory. In one method, the flash memory is first unplugged from the peripheral device, and then put within a programmer for updating. In the other, the flash memory is directly updating without unplugging it from the peripheral device, i.e., the flash memory is updated in circuit.

FIG. 1 shows a block diagram of a conventional system for updating a flash memory of a peripheral device. As shown in FIG. 1, according to the conventional method, a host 100 uses a driver to control a host interface controller 102 and the host interface controller 102 is used for controlling signal transmission between the host 100 and a peripheral device 106 through an interface 104. The interface 104, which may be an integrated device electronics (IDE) interface, connects to a peripheral device 106. The peripheral device 106 can be a hard disk, a compact disc drive such as a CD-ROM, or a digital versatile disc-read only memory (DVD-ROM) drive, etc.

The peripheral device 106 contains a peripheral interface controller 108, a microcontroller unit (microcontroller or MCU) 110, a loader ROM 112 and a flash memory 114. The peripheral interface controller 108 controls signal transmission between the peripheral device 106 and the host 100 trough the interface 104. The peripheral interface controller 108 connects to the MCU 110, the loader ROM 112 and the flash memory 114 within the peripheral device 106. The MCU 110 is used for executing programs stored in the flash memory 114 and controls the peripheral device 106. The loader ROM 112 is used for recording a programming procedure, programming code, and firmware code, all of which are needed during flash memory updating. The flash memory 114 is used for storing programs used for operating the peripheral device 106 under normal circumstances. A loading program used for updating the flash memory is stored in the loader ROM 112 which can be an independent memory block inside or outside the MCU 110. Alternatively, the loading program may be downloaded from the host 100.

Referring to FIGS. 1 and 2, FIG. 2 depicts a flow chart of a conventional method for updating a flash memory. At step 204, the host 100 uses the driver to acknowledge the MCU 110 to update the flash memory 114 th rough the host interface controller 102 and the interface 104. At the step 206, the MCU 110 temporarily suspends current executed command while at the same time, the host 100 transmits a new updated program to the MCU 110 for updating the flash memory 114. The flash memory 114 is then updated by the MCU 110 according to the programming procedure, the programming code, and the firmware code stored in the loader ROM 112.

At step 208, after the flash memory 114 is completed, a checking step is performed to check whether the flash memory 114 has been updated correctly. If the flash memory 114 is not updated correctly, the update procedure repeats step 206 until the flash memory 114 is updated correctly. If the flash memory 114 is updated correctly, the update procedure completes and the MCU 110 then executes the updated content of the flash memory.

Therefore, according to the conventional method, a loader ROM must be used for updating the flash memory, resulting in an increase in the cost. Furthermore, for supporting various types of flash memories in the system, a number of programming procedures and codes for various types of flash memories as well as a program for updating the flash memory must be recorded in the loader ROM. However, if a new release or a new model flash memory is used in the peripheral device 106, the update procedure can not be executed according to the programming procedure, the programming code, and the firmware code stored in the loader ROM 112. Accordingly, a new loader ROM must be installed before the updating of the flash memory can continue, and cost for updating is increased.

SUMMARY OF THE INVENTION

The invention provides a system and a method for updating a flash memory of a peripheral device. According to the present invention, no loader ROM is needed in the peripheral device, and the peripheral device does not need to record various programming procedures, programming codes, and firmware codes. The update procedure is entirely executed and controlled by the host. The system or method of the present invention is simple and cost effective and is not limited by differing types of flash memories.

It is therefore an objective of the invention to provide a system for updating a flash memory of a peripheral device. The system includes a host that sends an update content. The peripheral device contains a peripheral interface controller and a flash memory. The peripheral interface controller couples to the host, and the flash memory couples to the peripheral interface controller. When the peripheral interface controller detects a signal for updating the flash memory from the host, the peripheral interface controller updates the flash memory according to the update content.

It is another objective of the invention to provide a method for updating a flash memory of a peripheral device from a host. The method includes the following steps: detecting a setup signal transmitted from the host to the peripheral device; activating a loading circuit and the flash memory; idling a micro controller unit of the peripheral device, transmitting to the peripheral device an update content from the host to update the flash memory; verifying the updated content of the flash memory; and transmitting a terminate command to the peripheral device for terminating to update the flash memory and activating the micro controller unit.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings, FIG. 1 (Prior Art) shows a block diagram of a conventional system for updating a flash memory of a peripheral device.

DESCRIPTION OF THE PREFERRED EMBODIMENTS

Figure 1:
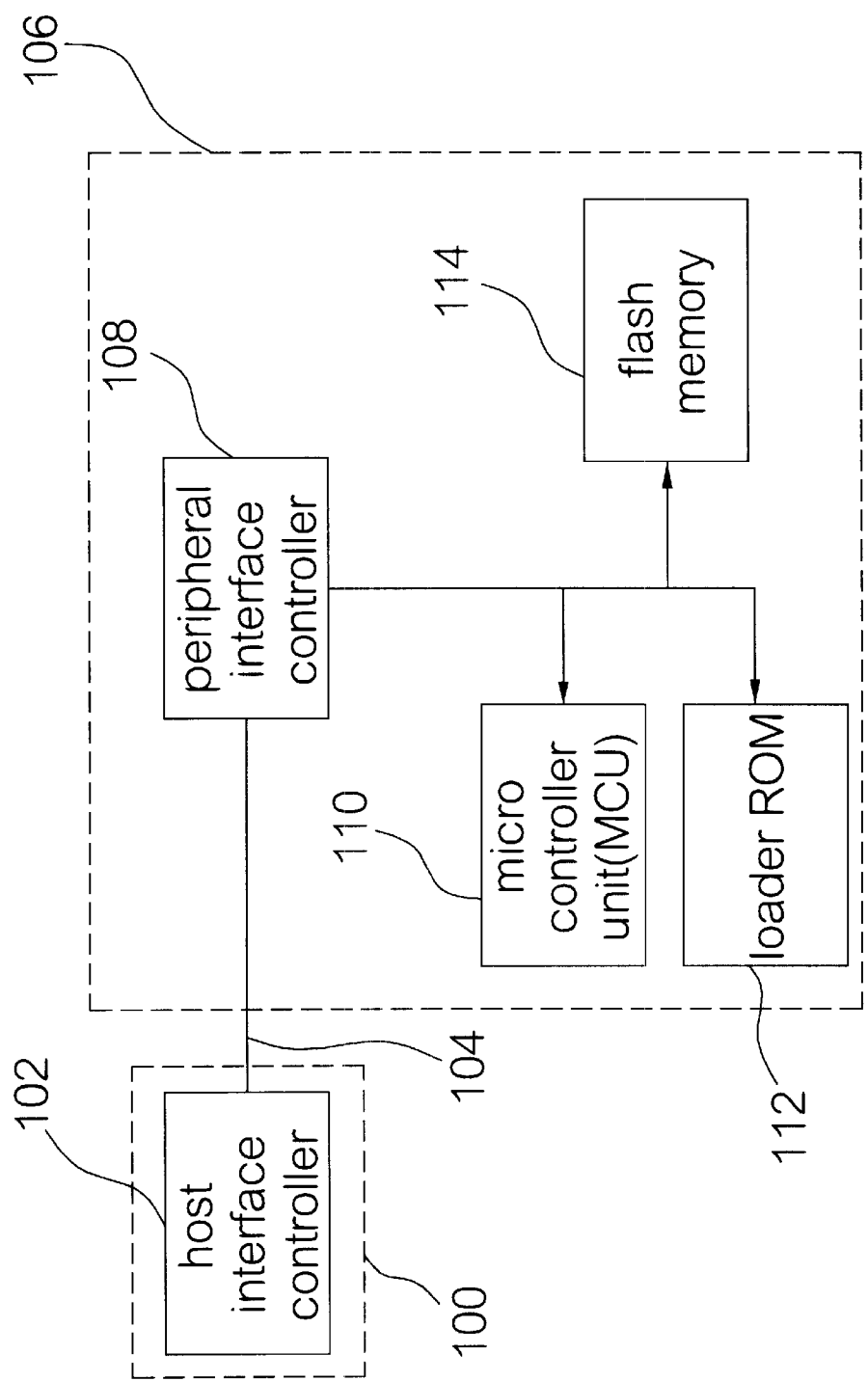
Figure 2:
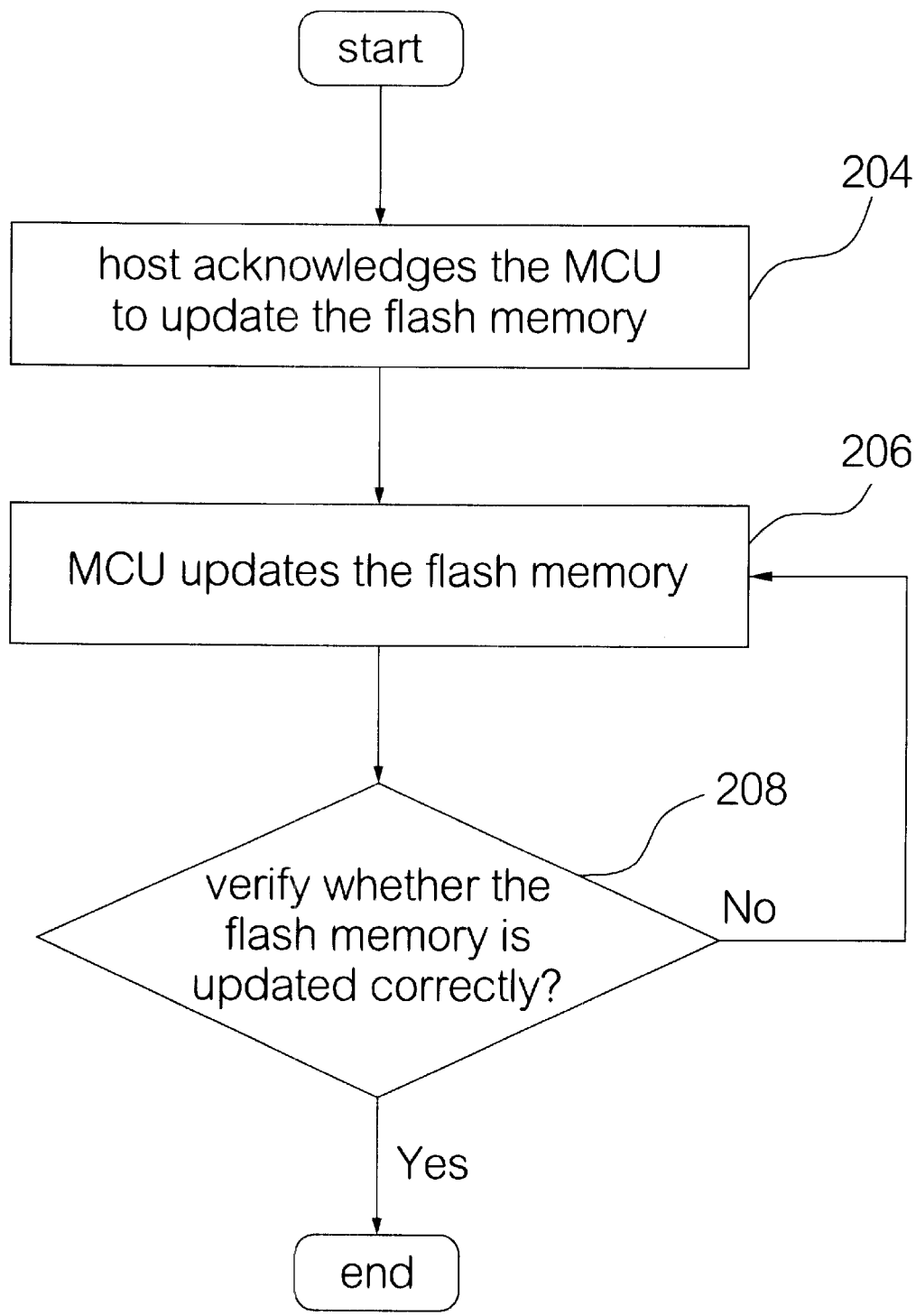
FIG. 2 (Prior Art) is a flow chart of a conventional method for updating the flash memory of the peripheral device.
Figure 3:
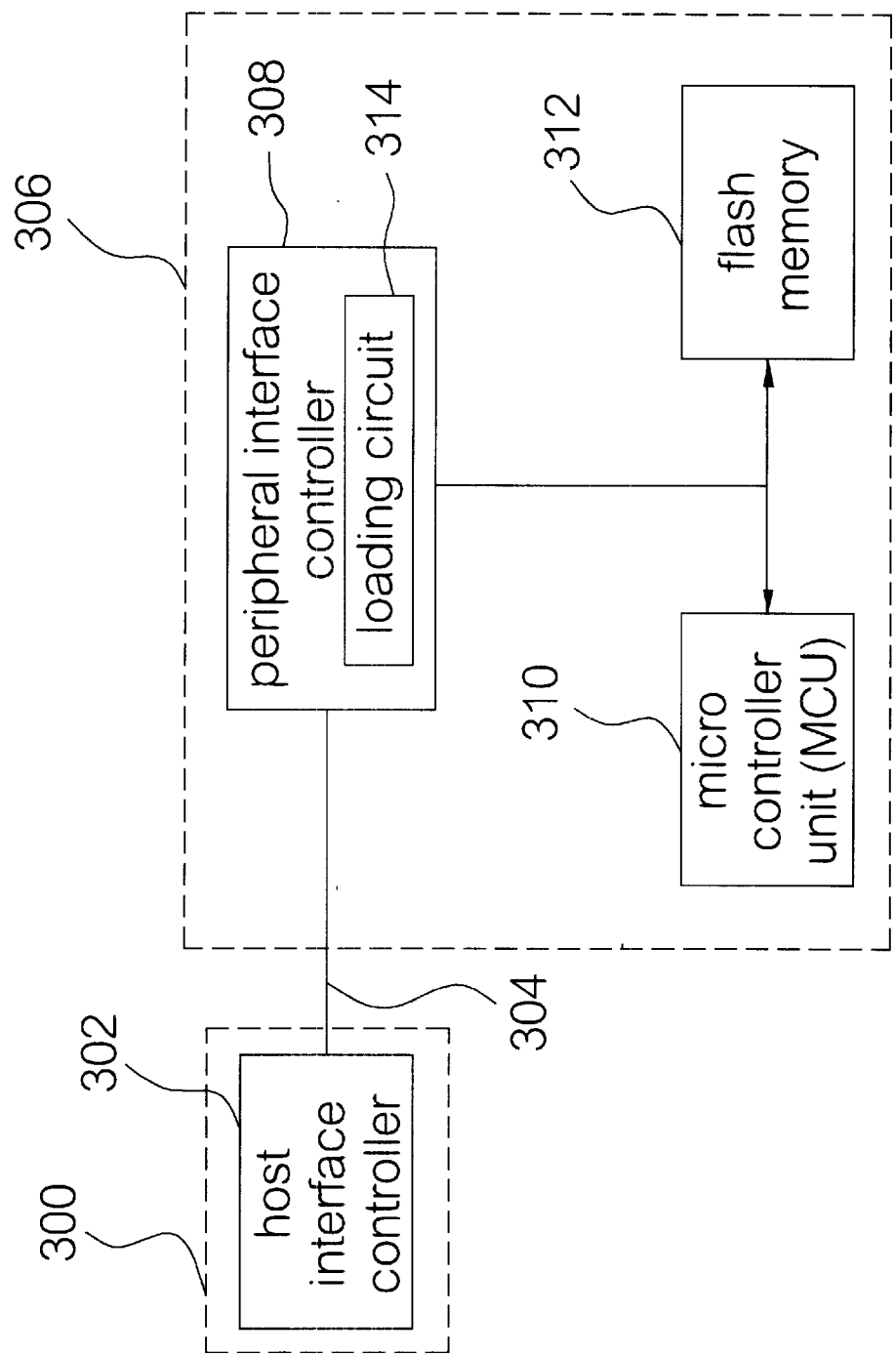
FIG. 3 schematically shows a block diagram of a system for updating a flash memory of a peripheral device according to one embodiment of the present invention.

FIG. 3 schematically shows a block diagram of a system for updating a flash memory of a peripheral device according to one embodiment of the present invention. In a computer system, such as a personal computer (PC), a host 300 controls an internal host interface controller 302 by a driver. The host interface controller 302 in the host 300 controls signal transmissions between the host 300 and a peripheral device 306 through an interface 304. The interface 304 of the embodiment can be an integrated device electronics (IDE) interface, and the peripheral device 306 can be a hard disk, compact disc-read only memory (CD-ROM) drive, or digital versatile disc-read only memory (DVD-ROM) drive to name but a few.

The peripheral device contains a peripheral interface controller 308 for controlling signal transmission between the peripheral device 306 and the host 300 through the interface 304. The peripheral interface controller 308 further is coupled to a micro controller unit (MCU) 310 and a flash memory 312. The MCU 310 is used for executing programs stored in the flash memory 312 relevant to the peripheral device 306 and also for controlling the peripheral device 306.

According to the embodiment of the present invention, a loading circuit 314, is provided. The loading circuit 314 may be integrated into the peripheral interface controller 308 for replacing the micro controller unit 310 to perform the flash memory update procedure. The loading circuit 314 is a combination of logic circuits, which further comprises signal lines connected to the flash memory 312 for updating the flash memory 312 from the host 300.

The present invention further provides a download protocol for updating the flash memory 312 between the peripheral device 306 and the host 300. The download protocol comprises a setup phase T1, a programming phase T2, a verify phase T3, and a terminate phase T4.

Figure 4:
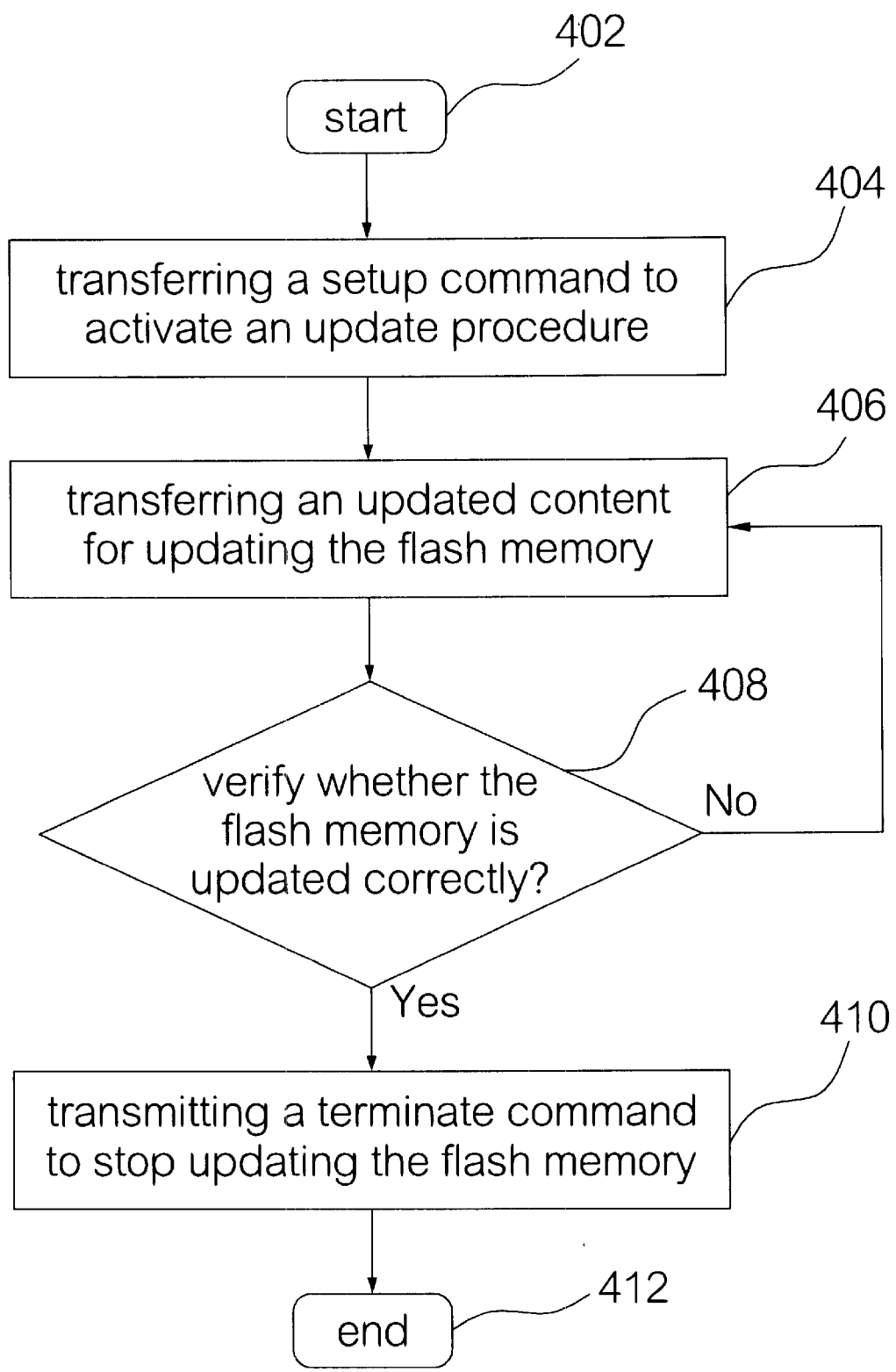
FIG. 4 schematically illustrates a flow chart of the method for updating the flash memory of the peripheral device according to the invention.

FIG. 4 schematically illustrates a flow chart of updating the flash memory of the peripheral device according to the invention. Referring to FIGS. 3 and 4, the loading circuit 314 continuously detects signals transmitted from the host 300 to the peripheral device 306 under normal operating conditions. The micro controller unit 310 executes programs stored in the flash memory 312 and controls all operations of the peripheral device 306. As show in FIG.4, the update procedure begins at step 402 whereby the host 300 begins to perform the procedure for updating the flash memory 312.

The driver executes steps 404–410 according to the download protocol of the present invention. Each of the steps 404, 406, 408, and 410 correspond to the setup phase T1, programming phase T2, verify phase T3, and terminate phase T4 respectively.

At step 404, the driver transfers the setup command to the peripheral device 306 through the host interface controller 302 and the interface 304. The loading circuit 314 is activated when the loading circuit 314 of the peripheral device 306 detects a setup command of the download protocol, and the loading circuit 314 waits for a program trigger command transmitted through the interface 304 by the host 300 to activate the flash memory update procedure. In addition to the setup command, a programming code corresponding to the flash memory 312 is transmitted to the peripheral device 306 because different types of flash memories have different programming codes for write protection.

At step 406, the loading circuit 314 idles the micro controller unit 310 of the peripheral device 306 and then gets the authority for controlling the flash memory 312. The driver then transfers an update flash memory program to the loading circuit 314 according to the programming code of the flash memory 312. The loading circuit 314 then directly updates the flash memory and, when the update procedure is complete, the updated program of the flash memory 312 is verified at step 408. The driver reads the content of the flash memory 312 through the host interface controller 302, the interface 304, and the peripheral device controller 308 to verify whether the updated content of the flash memory is correct. If the updated content is correct, step 410 is executed; otherwise, the update procedure returns to the step 406.

At step 410, the driver transfers a terminate command to the peripheral device 306 through the host interface controller 302 and the interface 304. When the loading circuit 314 of the peripheral device 306 detects the terminate command, the loading circuit 314 stops executing the update procedure 4e-the flash memory 312. At the same time, the loading circuit closes the flash memory 312 to prevent any incorrect write operation. The update procedure stops at step 412. Since the flash memory is updated, the loading circuit 314 recovers and re-activates the micro controller unit 310. The micro controller unit 310 then begins to read and execute the updated content from the initial address of the flash memory 312, and regains control of the peripheral device 306.

All transmitted signals of the download protocol are designed based on a communication protocol of the interface 304. For example, the setup command includes a number of commands that do not affect the normal operations of the interface 304. The commands are further sorted in a specific sequence. Likewise, the terminate command includes a number of commands that do not affect the normal operations of the interface 304. The commands are also sorted in a specific sequence.

Different flash memories have different programming procedures and programming codes. The programming procedures and codes are recorded in the driver. When the flash memory is changed, it is only necessary to change the programming procedures and codes. The loading circuit 314 is composed of logic circuits. The loading circuit 314, having a low gate count, can be made by modifying the peripheral interface controller 308.

Figure 5:
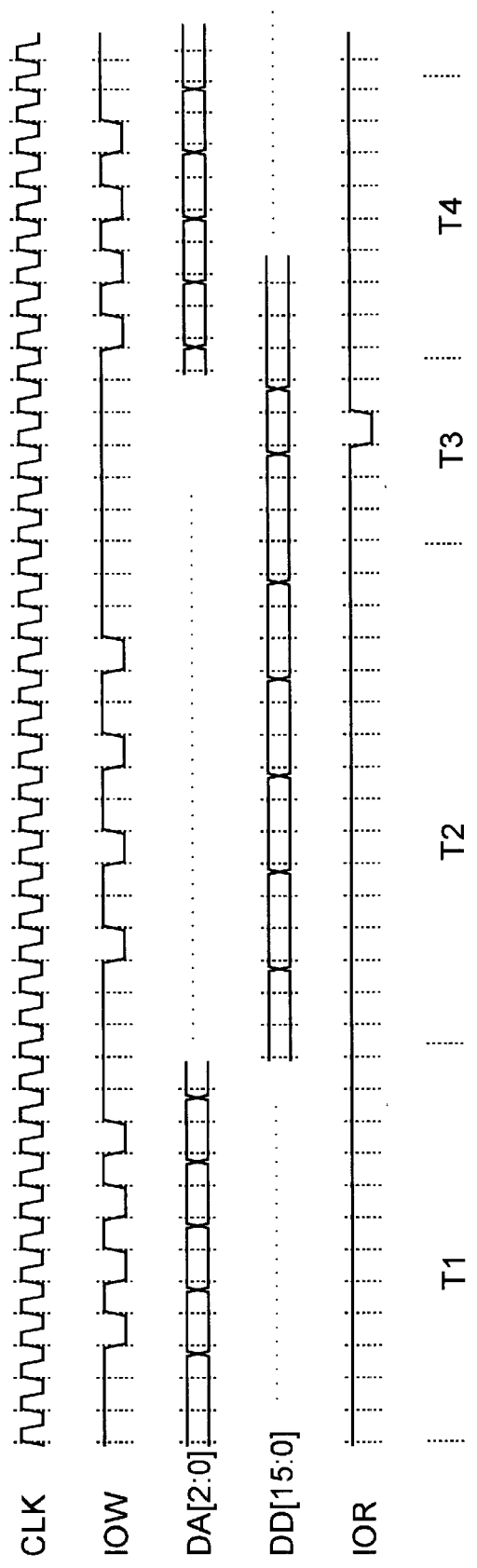
FIG. 5 shows an example of timing chart according to the update procedure shown in FIG. 4.

FIG. 5 shows an example of the timing chart according to the update procedure shown in FIG. 4. There may be many settings of the download protocol and the timing shown in FIG. 5 is only an example. FIG. 5 shows the relationship between a system clock signal CLK, write enable signal IOW, address port signal DA[2:0], data port signal DD[2:0], and read enable signal IOR on the interface 304. The download protocol can be divided into four phases: a setup phase T1, a programming phase T2, a verify phase T3, and a terminate phase T4.

In the setup phase T1, the driver can use address port signal DA[2:0] to transmit four consecutive commands serving as set up commands. The write enable signal IOW also sends four low level enable signals at the same time. These four commands are not used by the interface 304 under normal conditions. Under normal conditions, the interface 304 transmits commands to the peripheral device 306 through the address port signal DA[2:0] and waits for a response from the peripheral device 306. Therefore, the setup commands in the setup phase T1 include specified commands and specified command sequences, which can be distinguished over the normal read/write operations of the peripheral device 306. When the loading circuit 314 detects the setup commands, it begins to update the flash memory 312.

In the programming phase T2, the driver transmits the update content through the data port signals DD[15:0]. The sequence for writing the updated content depends on the programming procedures of flash memories. After the flash memory is updated, a verify procedure is performed in the verify phase T3. In the verify phase T3, the updated content of the flash memory is read and a low level enable signal is sent on the read enable signal IOR. After verifying, the update procedure proceeds to the terminate phase T4. Similar to the setup phase T1, four consecutive commands are sent on the address port signal DA[2:0]. Simultaneously, the write enable signal IOW also sends four low level enable signals. Again, these commands and command sequences are not used by the interface 304 under normal conditions. In the terminate phase T4, terminate commands are used rather than setup commands.

According to the embodiment of the present invention, a loading circuit is added into the peripheral device and the driver of the host is programmed to achieve the purposes of updating the flash memory. The host of the present invention can directly update the flash memory. Different programming procedures, programming codes and loading programs are provided on the host and as such, the peripheral device does not need a loading memory to load program. In this way, savings of space and cost is realized.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system for updating a flash memory of a peripheral device [306], the flash memory of a type, comprising:
   a host for transmitting an update content and for providing a programming procedure, a programming code, and a loading program, wherein the programming procedure and the programming code correspond to the type of the flash memory, and the loading program is provided according to the programming code; and
   a peripheral device, the peripheral device including a peripheral interface controller coupling to the host, the peripheral interface controller for coupling to the flash memory, the peripheral interface controller being responsive to a signal from the host for updating the flash memory with update content from the host, the peripheral device further comprising a microcontroller unit which is idled when the flash memory is being updated.

2. The system of claim 1, wherein the peripheral device is a hard disk drive.

3. The system of claim 1, wherein the peripheral device is a compact disc-read only memory (CD-ROM) drive.

4. The system of claim 1, wherein the peripheral device is a digital versatile disc-read only memory (DVD-ROM) drive.

5. A method for updating a flash memory of a peripheral device from a host, the peripheral device having a peripheral interface controller, the method comprising the steps of:
   detecting a setup command transmitted from the host to the peripheral interface controller;
   activating the flash memory;
   idling a micro-controller unit of the peripheral device with the peripheral interface controller, and transmitting an update content from the host to update the flash memory while the microcontroller unit is idled; and
   transmitting a terminate command to the peripheral interface controller for terminating the update of the flash memory and activating the microcontroller unit with the peripheral interface controller.

6. The method of claim 5, further comprising:
   providing a programming procedure and a programming code by the host for updating the flash memory.

7. The method of claim 5, further comprising:
   executing the updated content of the flash memory by the micro controller unit after re-activating the micro controller unit.

8. A method for updating a flash memory of a peripheral device from a host, the flash memory of a type, the peripheral device having a peripheral interface controller, a load program for updating the flash memory being provided by the host, the method comprising steps of:
   detecting a setup signal transmitted from the host to the peripheral interface controller;
   activating a loading circuit and the flash memory;
   idling a microcontroller unit of the peripheral device with the peripheral interface controller, while transmitting an update content from the host to update the flash memory;
   verifying the update content of the updated flash memory; and
   transmitting a terminate command to the peripheral interface controller for terminating updating the flash memory and activating the micro-controller unit by the peripheral interface controller,
   wherein a programming procedure and a programming code corresponding to the type of the flash memory are transmitted from the host to the peripheral device when the setup signal is transmitted.

9. A system for updating a flash memory of a peripheral device, comprising:
   a host for transmitting an update content and a load program for updating the flash memory; and
   a peripheral device, comprising:
      a peripheral interface controller comprising a loading circuit which couples to the host for receiving the load program and the update content, the flash memory coupling to the peripheral interface controller; and a microcontroller unit coupling to the peripheral interface controller and the flash memory, for controlling the flash memory;

wherein when the loading circuit detects a signal for updating the flash memory from the host, the loading circuit updates the flash memory according to the update content, and wherein the microcontroller unit is idled when the loading circuit updates the flash memory.

10. The system of claim 9, wherein the host provides a programming procedure and a programming code corresponding to the type of the flash memory.

* * * * *